(12) United States Patent
Schunke (10) Patent No.: US 8,316,729 B2
(45) Date of Patent: Nov. 27, 2012

(54) LINEAR UNIT

(75) Inventor: Kurt Schunke, Minden (DE)

(73) Assignee: RK Rose + Krieger GmbH Verbindungs-und Positioniersysteme, Minden (DE)

( * ) Notice: Subject to any disclaimer, the term of this patent is extended or adjusted under 35 U.S.C. 154(b) by 643 days.

(21) Appl. No.: 12/304,872

(22) PCT Filed: Jun. 5, 2007

(86) PCT No.: PCT/EP2007/055517
§ 371 (c)(1),
(2), (4) Date: Jun. 29, 2009

(87) PCT Pub. No.: WO2007/144295
PCT Pub. Date: Dec. 21, 2007

(65) Prior Publication Data
US 2009/0314111 A1    Dec. 24, 2009

(30) Foreign Application Priority Data

Jun. 14, 2006   (DE) .......................... 10 2006 027 523

(51) Int. Cl.
*F16H 27/02*   (2006.01)

(52) U.S. Cl. ..................................... 74/89.23
(58) Field of Classification Search ............... 74/89.23, 74/89.32, 89.33; 193/35 R, 37; 403/279, 403/283, 285
See application file for complete search history.

(56) References Cited

U.S. PATENT DOCUMENTS

| | | | | | |
|---|---|---|---|---|---|
| 4,171,394 | A | * | 10/1979 | Patil et al. ...................... | 148/533 |
| 5,287,762 | A | * | 2/1994 | Bonzak ......................... | 74/89.23 |
| 2005/0109139 | A1 | * | 5/2005 | Nagai et al. .................. | 74/89.33 |
| 2006/0260424 | A1 | * | 11/2006 | Becker et al. ................ | 74/89.23 |

FOREIGN PATENT DOCUMENTS

DE   200 16 209   12/2000
WO   WO 2004/028305   4/2004

* cited by examiner

*Primary Examiner* — Phillip A Johnson
(74) *Attorney, Agent, or Firm* — Henry M. Feiereisen, LLC (57) ABSTRACT

A linear unit, having a drive unit which is mounted in a guide tube (1) and supports a guide carriage (5) for holding a workpiece, a tool or the like, composed of a threaded spindle (2) and a spindle nut (4), wherein the guide carriage (5) or the spindle nut (4) is guided in a longitudinal groove (3) of the guide tube (1) in a rotationally fixed and axially movable manner, is embodied in such a way that the guide tube (1) is composed of a sheet metal strip which is curved around an imaginary longitudinal axis.

5 Claims, 8 Drawing Sheets

LINEAR UNIT

BACKGROUND OF THE INVENTION

The invention relates to a linear unit.

Such linear units move machine components, which are supported on the guide carriage, back and forth, for example. To this end, the threaded spindle is rotated by a motor or manually so that the spindle nut supported thereon, which is held in the guide tube, performs an axial movement that is oscillating, depending on the rotational direction of the threaded spindle. Of course, there is also the possibility to hold the guide carriage in the longitudinal groove of the guide tube in a rotationally fixed manner. In each case, the guide carriage and the spindle nut are securely connected with each other.

Up until now, extruded sections have been used as the guide tubes, which are typically made of a light metal. The guide slot is realized in the extruded sections by mechanical processing, preferably by milling. However, this type of processing is associated with significant labor, which includes both the milling and the subsequent refinishing such as burring or the like.

However, such processing can only be realized with significant expenditure, which, naturally, conflicts with a rational and cost-effective production required for guide tubes that are to be used as series parts in high quantities.

Therefore, DE 200 16 209 U1 proposes to realize the longitudinal slot in the guide tube at the time of extrusion so that, essentially, the mentioned work steps are not needed. As a consequence, an improvement over the above-mentioned state of the art is achieved.

However, relatively large tolerance must be put up with, which is unacceptable for certain applications.

In these cases, thick-walled precision steel tubes are used. However, these thick-walled precision steel tubes must be mechanically processed again, i.e., by cutting them to length via sawing, by facing their ends and by inserting the slot. In the latter case, a pre-milling step is performed at first. Then a milling step is completed and a burring step is performed. Finally, since steel tubes made of carbon steel are typically used, an electro-galvanizing process is required in order to keep the processed surfaces corrosion-resistant.

Overall, the known linear units are not suitable to meet all required conditions, both with respect to a cost-effective production and with respect to a high production accuracy.

SUMMARY OF THE INVENTION

Therefore, it is an object of the invention to further develop a linear unit of the generic kind such that it can be produced with less cost and such that it exhibits a high production accuracy, i.e., low tolerances, with little effort.

This object is attained by a linear unit having a drive unit which is mounted in a guide tube and supports a guide carriage for receiving a workpiece, a tool or the like, with the drive unit including a threaded spindle and a spindle nut, wherein the guide carriage or the spindle nut is guided in a longitudinal groove of the guide tube in a rotationally fixed and axially movable manner, wherein the guide tube is made of a sheet metal strip which is curved around an imaginary longitudinal axis.

Above all, a guide tube according to the invention can be produced and used in a very cost-effective manner. A longitudinal slot is automatically realized if the width of the metal sheet strip is smaller than the total perimeter of the guide tube. Of course, the cross section contour of the guide tube is not restricted to the circular shape. Rather, it can have any arbitrary shape, i.e., both an elliptical and a polygon shape, for example.

Aside from the simpler production, in which, essentially, a mechanical processing of the guide tube is not needed and which is extraordinarily cost-effective, the high production accuracy is to be stressed too, since the tightest tolerances can be complied with. This applies, in particular, to the width tolerances of the longitudinal slot so that very precise guiding of, e.g., the spindle nut in the longitudinal slot is possible without problem.

Thus, compared to the described involved processing of a precision steel tube for this purpose, the invention constitutes a significant improvement that contributes to an optimized production of the entire linear unit.

A suitable material such as galvanized sheet steel or a stainless material can be used for the metal sheet, which is bent to form the guide tube, as needed.

The fact that the individual component "guide tube" can be kept in stock as a ready-made part that is merely to be cut to length in accordance with a specific request contributes to a cost-effective production of an overall system too. Thus, extremely short production times can be met.

In accordance with an advantageous further development of the invention, the opposite walls that delimit the longitudinal groove are turned inwards towards the tube so as to establish edges with a relatively large guide surface for the spindle nut.

In this area, the spindle nut can also be formfittingly connected with the guide tube in a way that results in a laterally secure fixation. To this end, the spindle nut can have two longitudinal grooves that extend in the axial direction. Each of the mentioned edges of the longitudinal slot of the guide tube engages in a respective one of the two longitudinal grooves. In this sense, the spindle nut is always fixed in the respective load area, which essentially always exists only where the spindle nut and/or the guide carriage connected thereto is used.

The threaded spindle is on its end sides supported in end pieces which, at the same time, close the ends of the guide tube.

Each end piece has a pin-like projection which extends on the end side into the guide tube and which has, in a manner comparable to the spindle nut, two longitudinal grooves too in which a respective one of the edges of the longitudinal slot of the guide tube engages.

In this way, a deformation of the guide tube due to forces acting from the outside is effectively prevented, since the guide tube is securely fixed in its end area in the pin-like projection.

A small collar is arranged next to the pin-like projection. The outer diameter of the small collar equals about the outer diameter of the guide tube, which results, for the most part, in a flush transition between the guide tube and the end piece. A ball bearing or plain bearing is arranged in each end piece to support the rotatable spindle nut. The spindle engages with an end pin in the ball bearing or plain bearing.

While the threaded spindle is provided with an external thread, the end pins on both sides have a smooth shaft, wherein one of the end pins transitions in an axial extension into a drive pin, which can be formfittingly connected, in a rotationally fixed manner, with a drive element by means of a fitted key, for example. The drive element is, e.g., a motor or a gearbox part.

Up until now, the end pins are formed at the threaded spindle by metal-cutting processing, typically by lathing. As a semi-finished part, the threaded spindle is provided with a continuous external thread.

Naturally, this too is only possible with significant labor and cost which does not permit optimized production so far.

Therefore, in accordance with another idea of the invention, the end pin is embodied as a separate part and the threaded spindle in the form of the semi-finished part is merely cut to length and the end pin is attached thereto.

The end area of the end pin that faces the threaded spindle can be embodied as a sleeve, which is provided with an internal thread so that the end pin can be screwed onto the threaded spindle and secured thereto by suitable measures.

In accordance with a preferred embodiment, the sleeve is connected to the threaded spindle via swaging, wherein from the outside, i.e., from the outer surface area, marks are realized in the sleeve, preferably with an embossing device that is equipped with embossing thorns. The marks carve themselves into the external thread of the spindle, which is typically in the form of a trapezoid thread.

Suitably, multiple protuberances are provided for this purpose in spaced-apart relationship about the perimeter, preferably at an angle of 120°, and arranged as pairs at a distance to each other in the longitudinal direction of the spindle and the sleeve, respectively, for example.

Due to this even formfit, a perfect true run of the spindle and the sleeve or the spindle and the pin connected to the sleeve is achieved. In addition, a disconnection is virtually impossible even if a high torque is to be transferred.

It is, however, also conceivable to connect the end pin with the threaded spindle in by material union, e.g., by gluing or soldering.

Fundamentally, the guide tube in accordance with the invention can be modified as needed. This includes, for example, realizing lateral embossments which extend in the longitudinal axis direction and into which the guide carriage can engage. As a result, a particularly secure connection of the guide carriage at the guide tube is created.

Further advantageous embodiments of the invention are described in the sub-claims.

BRIEF DESCRIPTON OF THE DRAWING

Exemplary embodiments of the invention are described below with reference to the attached drawings.

It is shown in.

DETAILED DESCRIPTION OF PREFERRED EMBODIMENTS

Figure 1:
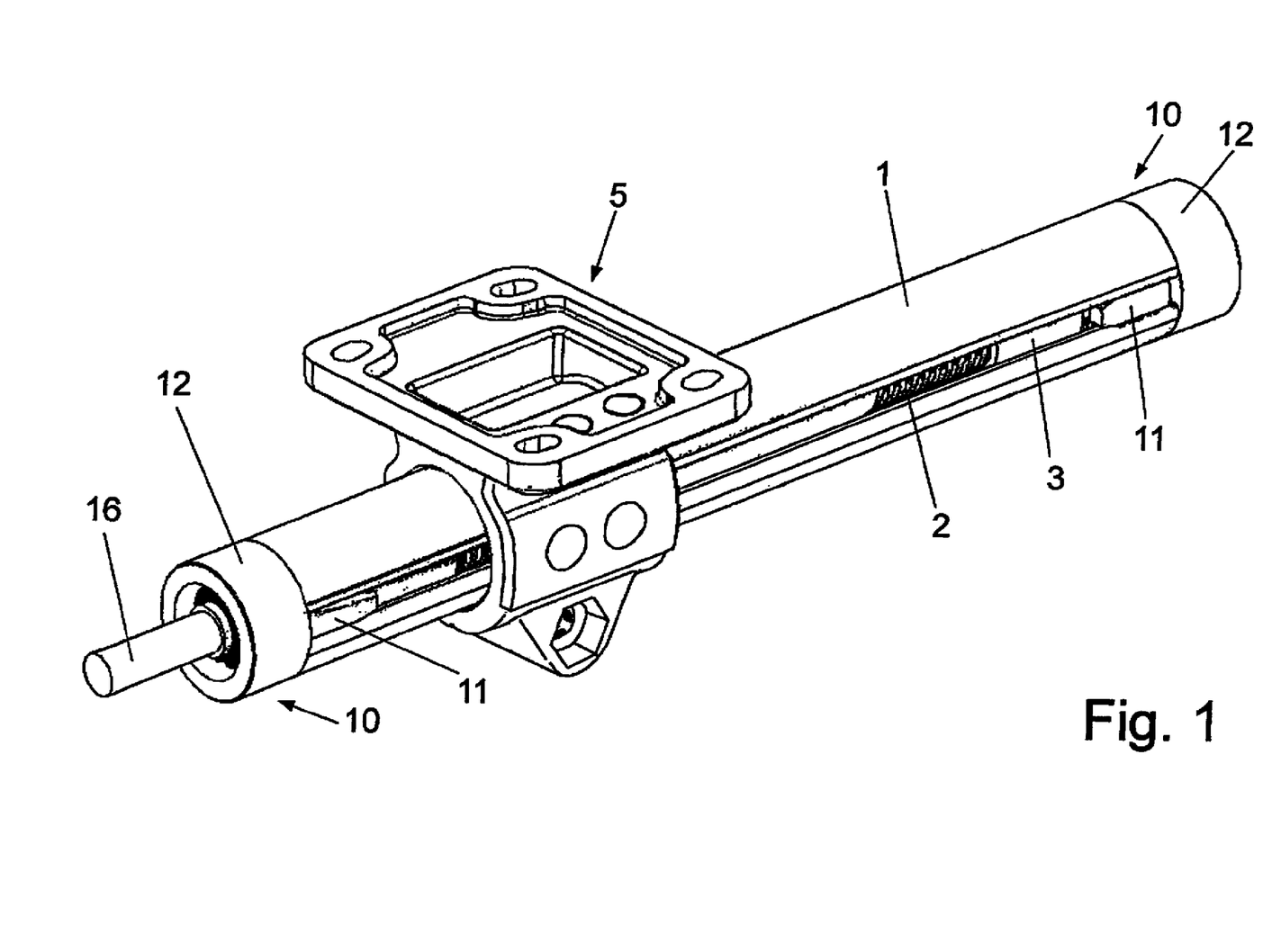
FIG. 1 a perspective view of a linear unit according to the invention.
Figure 10:
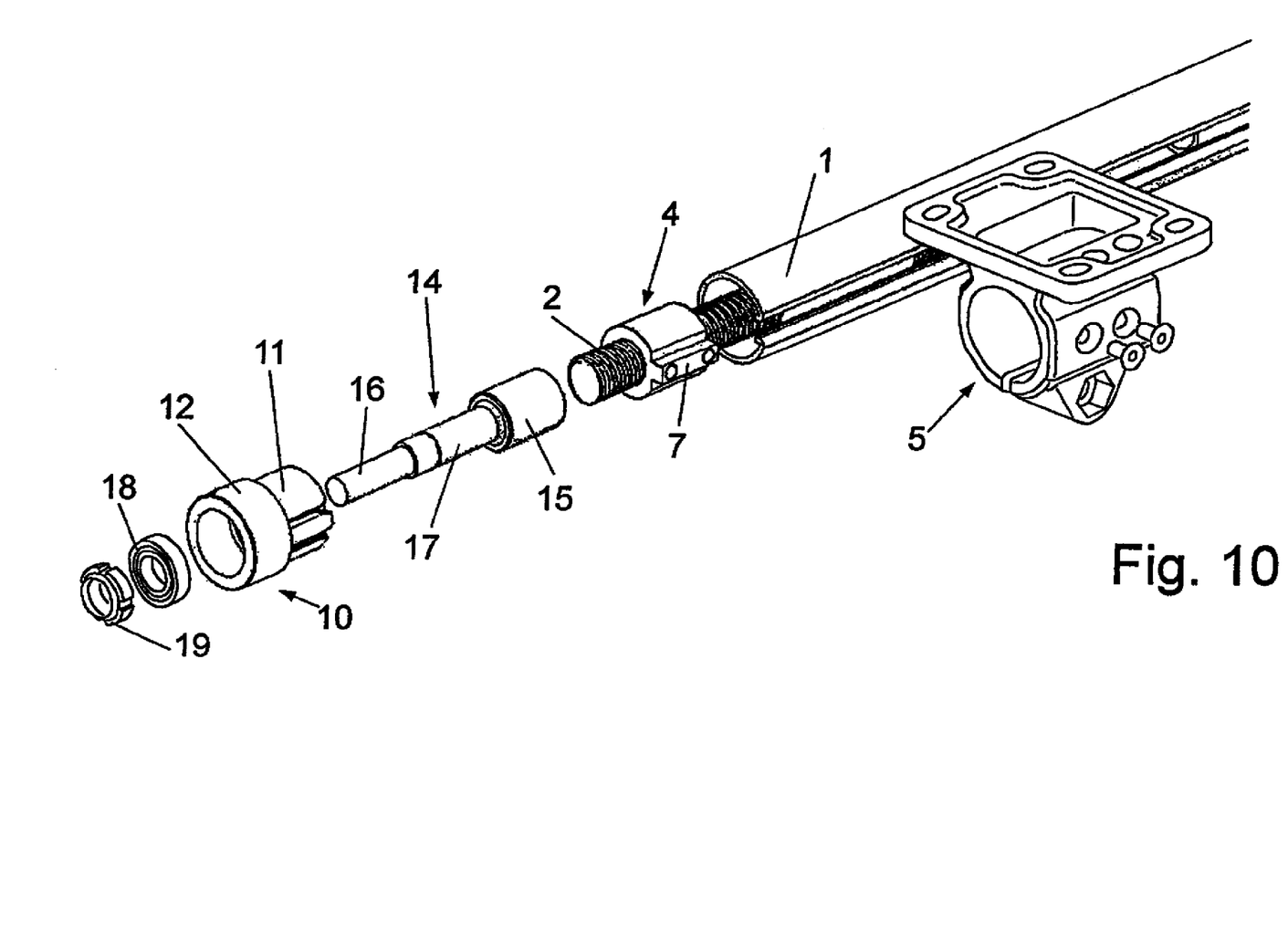

Both FIG. 1 and FIG. 10 show a linear unit having a drive unit, which is supported in a guide tube 1 and which carries a guide carriage 5 for receiving a workpiece, a tool or the like. The drive unit includes a threaded spindle 2 and a spindle nut 4 which is guided thereon. The spindle nut 4 is connected with the guide carriage 5 via a guide wedge 7.

The spindle nut 4, which is axially movable on the threaded spindle 2, is held in a longitudinal groove 3 of the guide tube 1 and constraint against rotation by means of the guide wedge 7, wherein the spindle nut 4 and, thus, the guide carriage 5 can be axially moved when the threaded spindle 2 is rotated.

Figure 2:
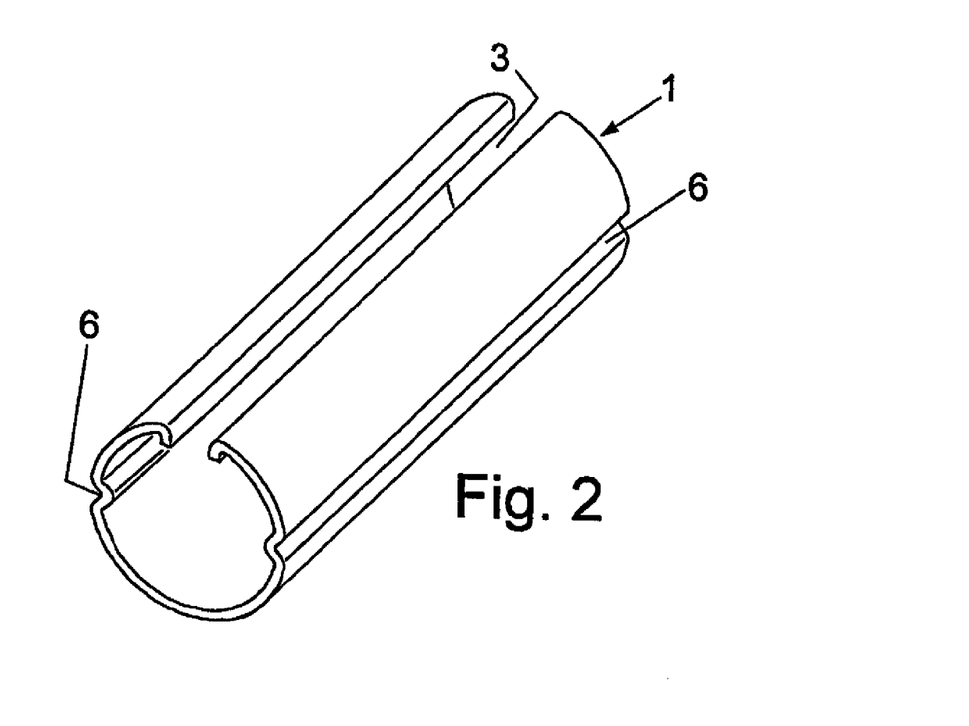
FIG. 2 a diagrammatic illustration of a guide tube of the linear unit according to the invention, FIG. 3 a cross section of the guide tube of FIG. 2, FIG. 4 another exemplary embodiment of the guide tube, again in a perspective view, FIG. 5 a cross section illustration of another exemplary embodiment, FIG. 6 a perspective view of a detail of the linear unit, FIG. 7 a cross section view of the detail of FIG. 6 in an assembled position, FIG. 8 a further detail of the linear unit, again in a diagrammatic illustration, FIG. 9 a cross section view of the detail of FIG. 8 in an assembled position, FIG. 10 an enlarged illustration of the linear unit, FIG. 11 a schematic illustration of the linear unit in a top section view, FIG. 12 a detail of the illustration of FIG. 11, again in a top section view, FIG. 13 a detail of the linear unit in a schematic longitudinal section view.
Figure 3:
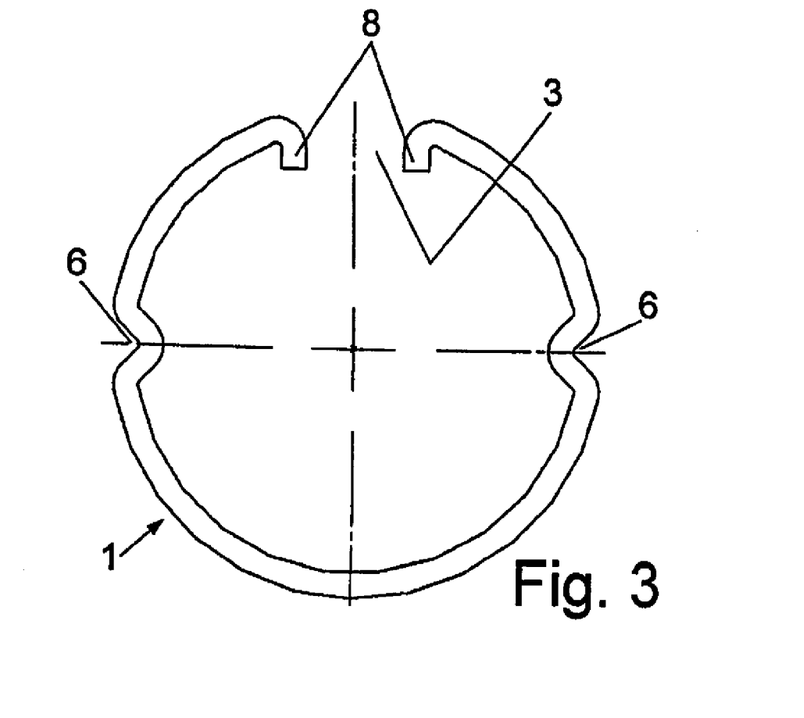

In accordance with the invention, the guide tube 1 is made of a sheet metal strip which is bent about an imaginary longitudinal axis and which has embossments 6 on the outside that extend in the longitudinal axis direction, as shown in the example of FIGS. 2 and 3. The embossments serve the purpose of guiding and constraining the guide carriage 5 against rotation, for example.

Figure 4:
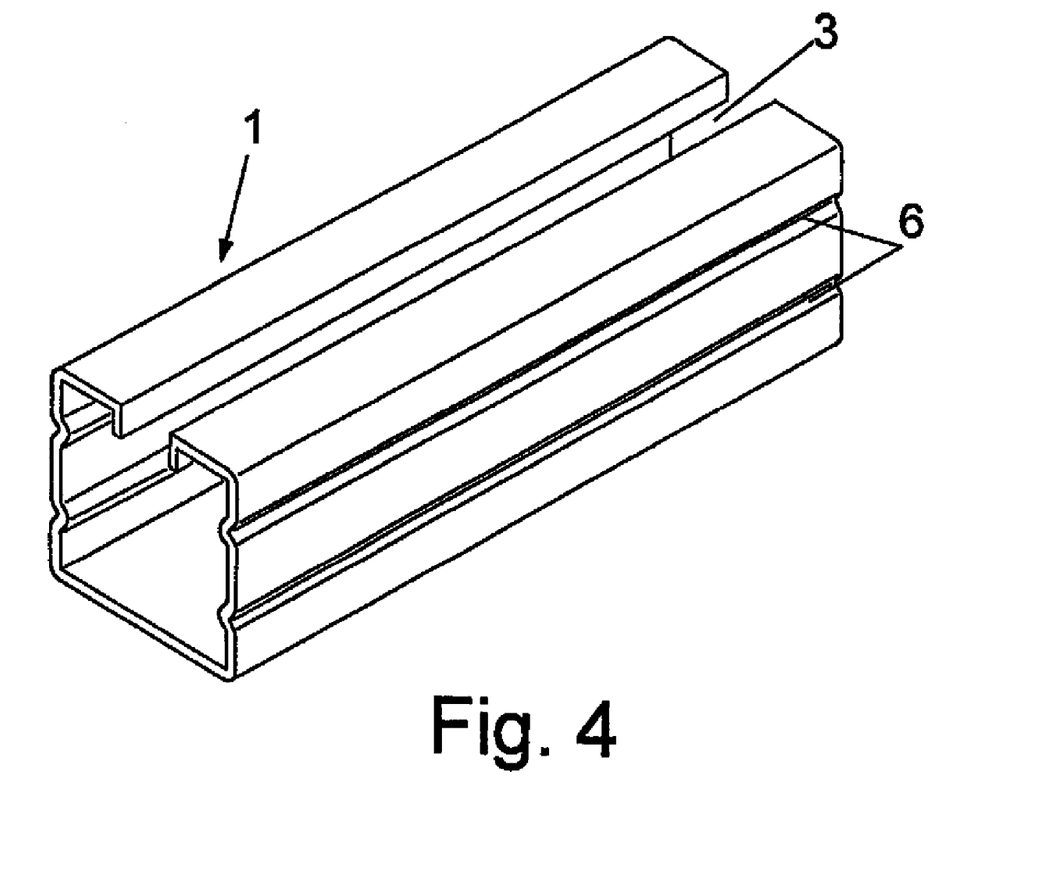

In FIG. 4, the guide tube 1 is embodied as a square tube and also provided with embossments 6 on two opposite sides. As is the case in the example of FIGS. 2 and 3, the guide tube 1 in the example in FIG. 5 too is essentially designed as a round tube, which has, however, in the example of FIG. 5, an even shaft, i.e. there are no embossments in the outer wall.

Figure 8:
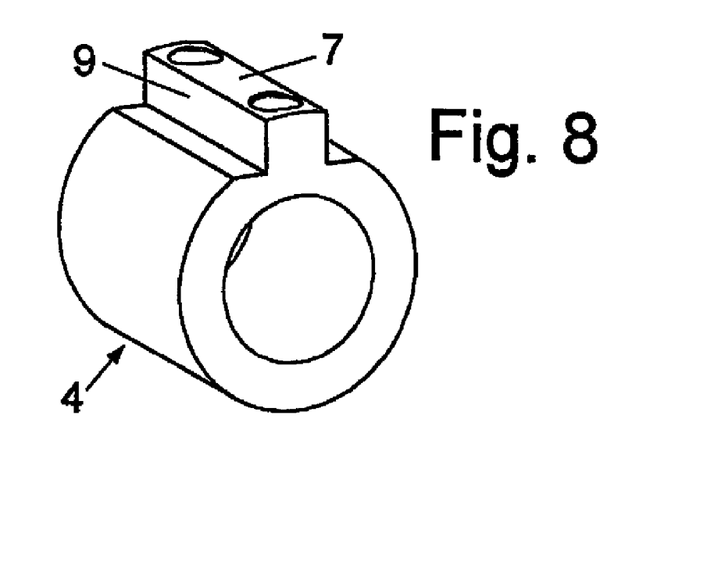
Figure 9:
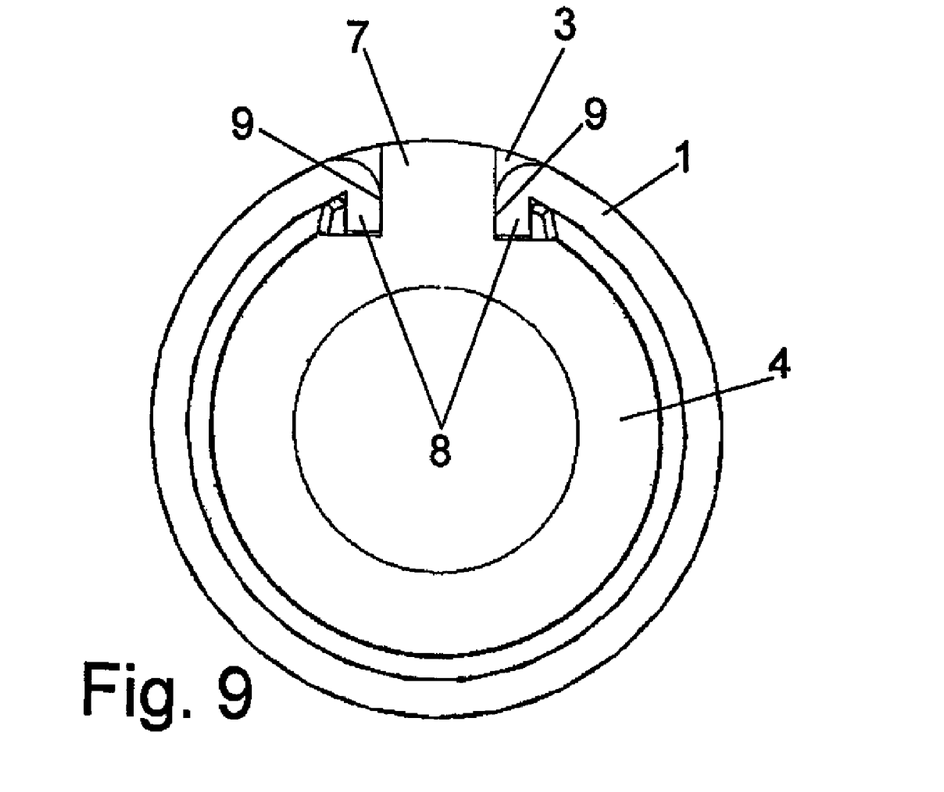

In all exemplary embodiments shown, the guide tube 1 has a longitudinal groove 3 with edges to form opposite walls and to provide guidance of the spindle nut 4. The clear width of the longitudinal groove 3 is about the width of the guide wedge 7, wherein the two outer sides of the guide wedge 7 form guide surfaces 9 which contact the respectively associated edge 8, as can be seen particularly clearly in FIG. 9, with the spindle nut 4 being schematically illustrated in FIG. 8, i.e., without the presence of an internal thread which corresponds to the threaded spindle 2.

Figures 5, 6, 7:
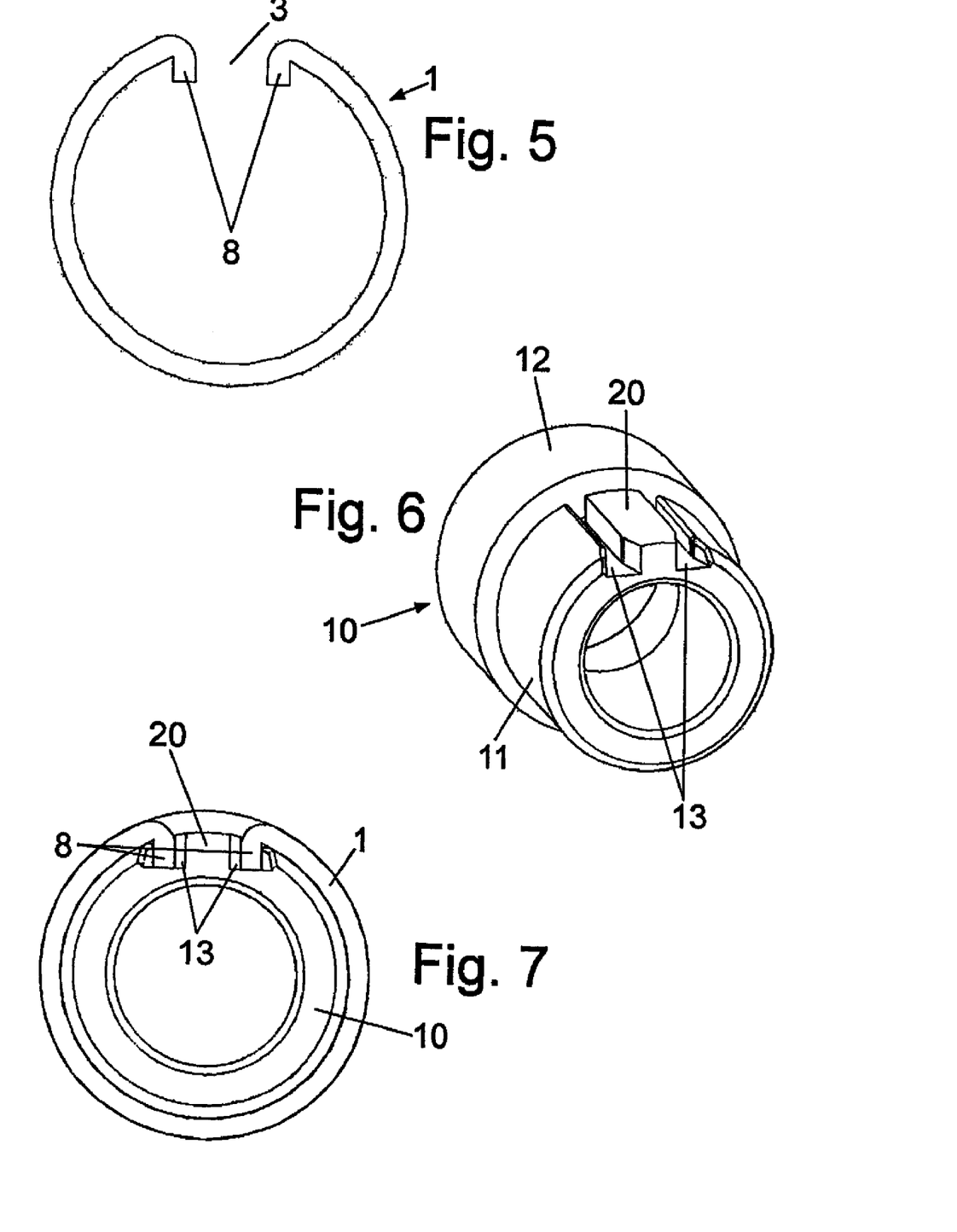

Each end of the guide tube 1 is closed by a respective end piece 10, which is shown as a detail in FIG. 6.

Figure 12:
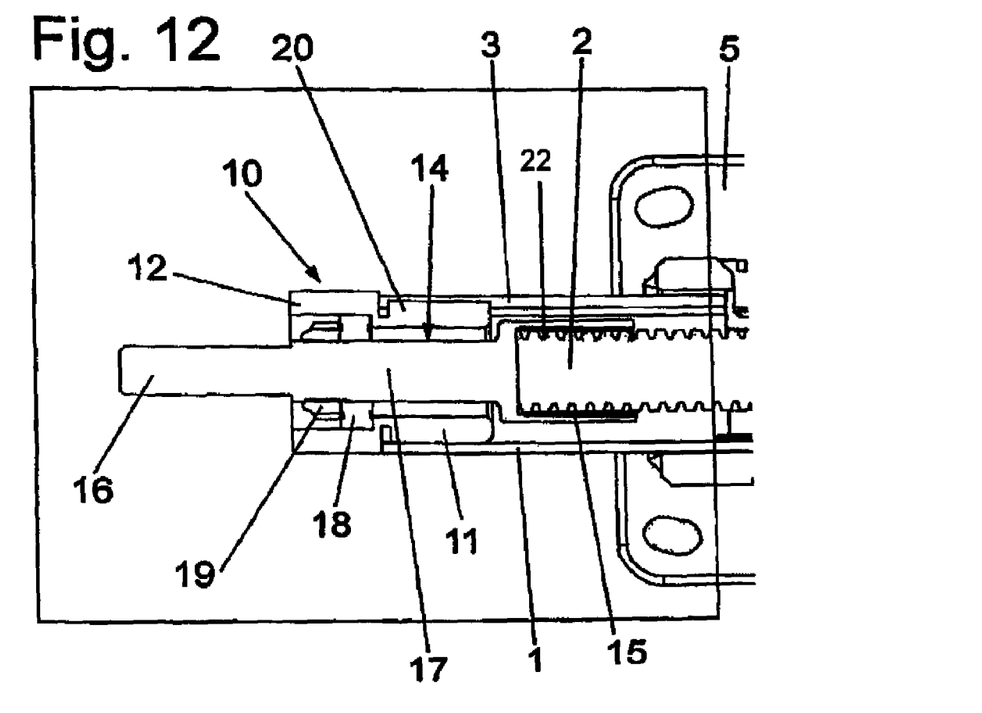

It can be seen that the end piece 10 has a pin-like projection 11, which is pinged into and snugly fits the interior of the guide tube 1, as can be seen particularly clearly in FIG. 12.

To constrain the end piece 10 against rotation and to stabilize the guide tube 1 in the end areas, the pin-like projection 11 has two grooves 13 that are arranged parallel and at a distance to each other. The two grooves 13 define a wedge 20 which extends into the longitudinal slot 3 of the guide tube 1 while each of the edges 8 rests in a respective one of the grooves 13.

A small collar 12 is arranged next to the pin-like projection 11. The small collar 12 contacts the face side of the guide tube 1 and the outer diameter of the small collar 12 is about equal to the outer diameter of the guide tube 1, which results in a flush transition.

Figure 11:
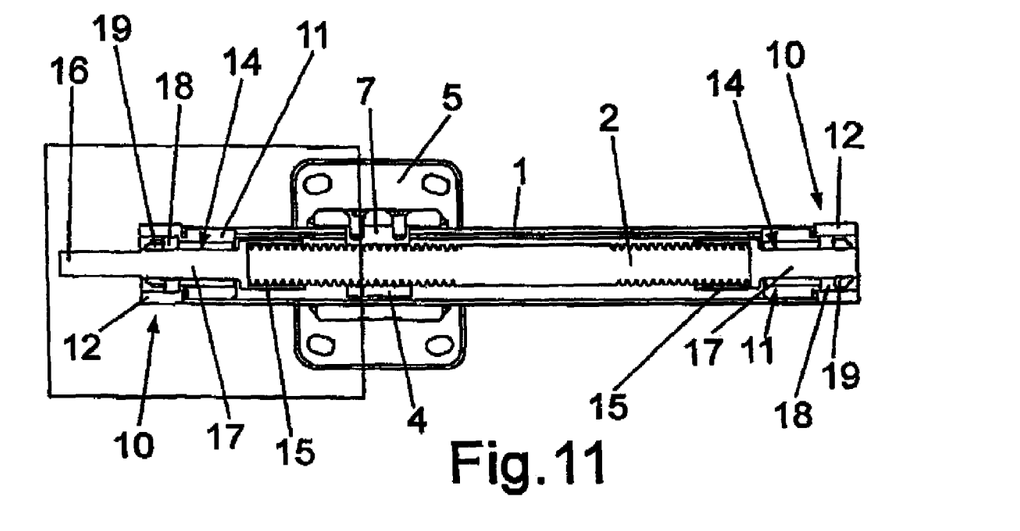

FIGS. 11 and 12 in particular show clearly that the threaded spindle 2 is rotatably supported on its end sides in the end pieces 10 by means of a connected end pin 14, wherein, in the respective small collar 12, a ball bearing 18 is arranged that is held in the end piece 10 via a nut 19 and in which the threaded spindle 2 or the end pin 14 is pivotably arranged.

FIG. 12 shows an enlarged view of a partial segment of FIG. 11. It can be seen that the end pin 14 is embodied as a separate part 11 and, on one end, formed as a sleeve 15, in which the corresponding end of the threaded spindle 2 is secured, for example by a material union 22.

A bearing pin 17, which sits in the ball bearing 18, is arranged next to the sleeve 15. On the side of the drive, the respective end pin 14 is additionally provided with a drive pin 16 that can be connected with a not shown drive unit in a rotationally fixed manner.

Figure 13:
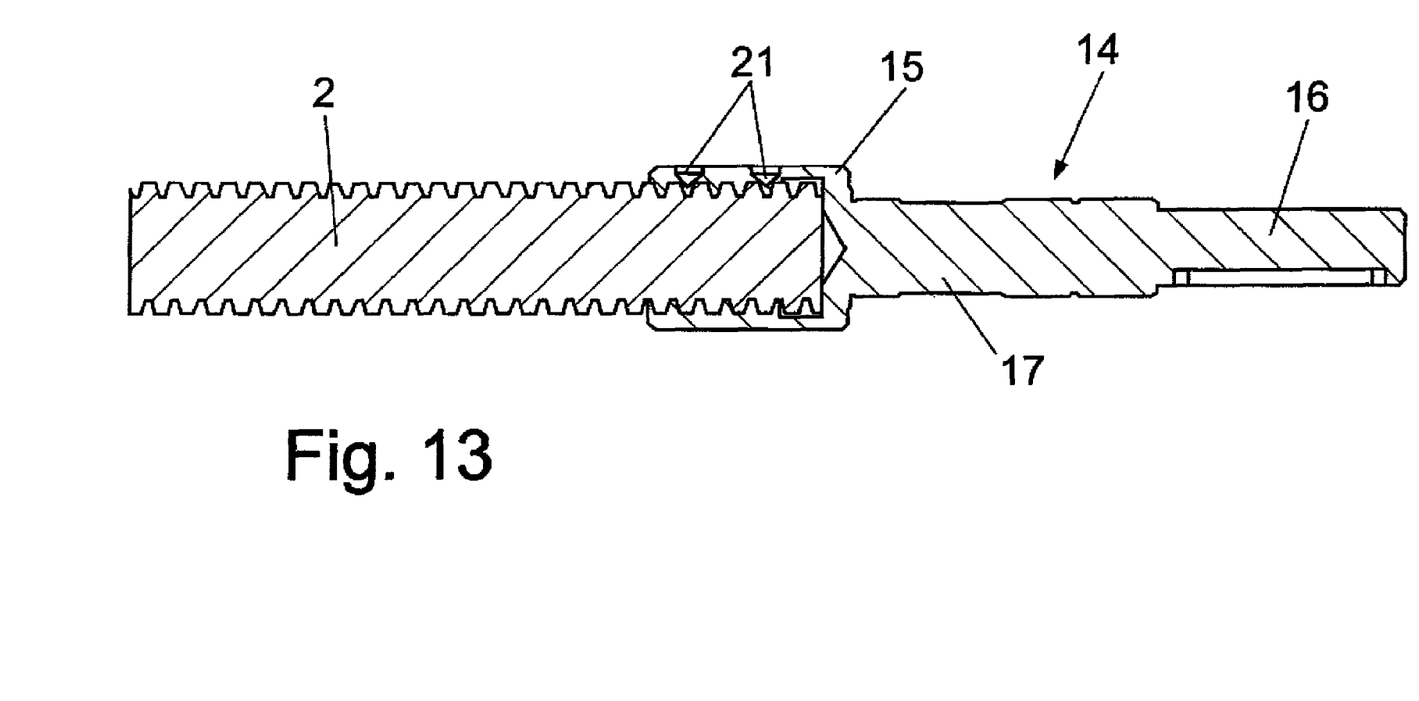

FIG. 13 shows a way of securing the end pin 14 to the threaded spindle 2.

The sleeve 15, which is concentrically arranged next to the bearing pin 17, is hereby screwed onto the threaded spindle 2, which is provided with a trapezoid thread, and swaged with the threaded spindle 2 via protuberances 21.

To this end, the protuberances 21 are embossed from the direction of the outer surface area of the sleeve 15 via not shown embossing dies while the threads of both the sleeve 15 and the threaded spindle 2 associated therewith deform.

As shown in FIG. 13, preferably two protuberances 21 are provided, which are arranged one after the other in the axial direction but at a distance to each other. The two protuberances 21 belong to a series, of which preferably three are distributed along the perimeter, i.e., at a distance of 120°.

What is claimed is:

1. A linear unit, comprising:
    a guide tube made of a sheet metal strip and open at its axial ends, which is bent about a longitudinal axis of the guide tube, and having a longitudinal groove;
    end pieces for closing the axial ends in one-to-one correspondence, each end piece having a pin-shaped projection for insertion into a corresponding axial end and a collar adjacent to the projection and bearing upon an end face of the guide tube,
    a drive unit supported in the guide tube and including a threaded spindle, and a spindle nut mounted on the threaded spindle; and
    end pins forming separate parts and having each an end in form of a sleeve, said end pins connected to opposite ends of the threaded spindle on one-to-one correspondence for rotatable support of the threaded spindle in the end pieces,
    a guide carriage supported by the drive unit and structured to carry a workpiece or a tool,
    wherein one member selected from a group consisting of the spindle nut and the guide carriage is guided in the longitudinal groove to allow movement in a direction of the longitudinal axis but is prevented from executing a rotation,
    wherein the sleeve has at least one protuberance for holding the sleeve in fixed rotative engagement on the threaded spindle; said at least one protuberance being introduced from the outer surface area of the sleeve and deforming thread turns.

2. The linear unit of claim 1, wherein the sleeve has a plurality of protuberances in circumferentially spaced-apart disposition.

3. The linear unit of claim 2, wherein the protuberances are spaced apart at an identical angular distance.

4. The linear unit of claim 1, wherein the sleeve has a plurality of protuberances in spaced-apart disposition along a longitudinal direction of the sleeve.

5. The linear unit of claim 1, wherein the end pins are connected to the threaded spindle by material union.

* * * * *